(12) United States Patent
Chen et al.

(10) Patent No.: US 11,847,505 B2
(45) Date of Patent: Dec. 19, 2023

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Tao Chen, Beijing (CN); Bing Liu, Tianjin (CN); Geng Han, Beijing (CN); Jian Gao, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 392 days.

(21) Appl. No.: 17/326,804

(22) Filed: May 21, 2021

(65) Prior Publication Data
US 2022/0327004 A1    Oct. 13, 2022

(30) Foreign Application Priority Data
Apr. 9, 2021    (CN) .......................... 202110385344.9

(51) Int. Cl.
*G06F 9/50*    (2006.01)
(52) U.S. Cl.
CPC ............ *G06F 9/5083* (2013.01); *G06F 9/505* (2013.01); *G06F 9/5016* (2013.01); *G06F 9/5038* (2013.01)

(58) Field of Classification Search
CPC ...... G06F 9/5016; G06F 9/5038; G06F 9/505; G06F 9/5083
See application file for complete search history.

(56) References Cited

U.S. PATENT DOCUMENTS

2022/0405104 A1*  12/2022  Chen ..................... G06F 9/3877

\* cited by examiner

*Primary Examiner* — Sisley N Kim
(74) *Attorney, Agent, or Firm* — Womble Bond Dickinson (US) LLP

(57) ABSTRACT

Embodiments of the present disclosure relate to a method, an electronic device, and a computer program product for managing a storage system. The method includes: determining, at a first device of the storage system, whether a load of a first accelerator resource of the first device exceeds a load threshold; sending, if it is determined that the load exceeds the load threshold, a job processing request to a second device in a candidate device list to cause the second device to process a target job of the first device using a second accelerator resource of the second device, the candidate device list indicating devices in the storage system that can be used to assist the first device in job processing; receiving, from the second device, latency information related to remote processing latency of processing the target job using the second accelerator resource; and updating the candidate device list based on the latency information. The embodiments of the present disclosure can optimize the system performance.

20 Claims, 7 Drawing Sheets

METHOD, DEVICE, AND COMPUTER PROGRAM PRODUCT FOR MANAGING STORAGE SYSTEM

CROSS-REFERENCE TO RELATED APPLICATION

This patent application claims priority, under 35 U.S.C. § 119, of Chinese Patent Application No. 202110385344.9, filed Apr. 9, 2021, which is incorporated by reference in its entirety.

TECHNICAL FIELD

Embodiments of the present disclosure generally relate to the field of data storage, and in particular, to a method, a device, and a computer program product for managing a storage system.

BACKGROUND

Accelerator resources (such as co-processors) are often used in storage systems to assist a central processing unit (CPU) in performing some acceleration tasks. For example, Quick Assist Technology (QAT) cards are also a type of co-processor that can be used to accelerate computationally intensive tasks, such as compression, encryption, decryption, and so on. For a storage system with multiple devices (sometimes referred to as nodes hereinafter), each device usually has separate accelerator resources, such as QAT cards. However, the accelerator resources on these devices are sometimes not utilized in a balanced manner. For example, in a multi-device system, although jobs can be distributed across devices, there is still a phenomenon of uneven distribution, which leads to some devices having to execute more jobs, resulting in large processing delay.

SUMMARY OF THE INVENTION

Embodiments of the present disclosure provide a method, a device, and a computer program product for managing a storage system.

In a first aspect of the present disclosure, a method for managing a storage system is provided. The method includes: determining, at a first device of the storage system, whether a load of a first accelerator resource of the first device exceeds a load threshold; sending, if it is determined that the load exceeds the load threshold, a job processing request to a second device in a candidate device list to cause the second device to process a target job of the first device using a second accelerator resource of the second device, the candidate device list indicating devices in the storage system that can be used to assist the first device in job processing; receiving, from the second device, latency information related to remote processing latency of processing the target job using the second accelerator resource; and updating the candidate device list based on the latency information.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: determining, at a first device of a storage system, whether a load of a first accelerator resource of the first device exceeds a load threshold; sending, if it is determined that the load exceeds the load threshold, a job processing request to a second device in a candidate device list to cause the second device to process a target job of the first device using a second accelerator resource of the second device, the candidate device list indicating devices in the storage system that can be used to assist the first device in job processing; receiving, from the second device, latency information related to remote processing latency of processing the target job using the second accelerator resource; and updating the candidate device list based on the latency information.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

In the accompanying drawings, identical or corresponding reference numerals represent identical or corresponding parts.

DETAILED DESCRIPTION

Figure 1:
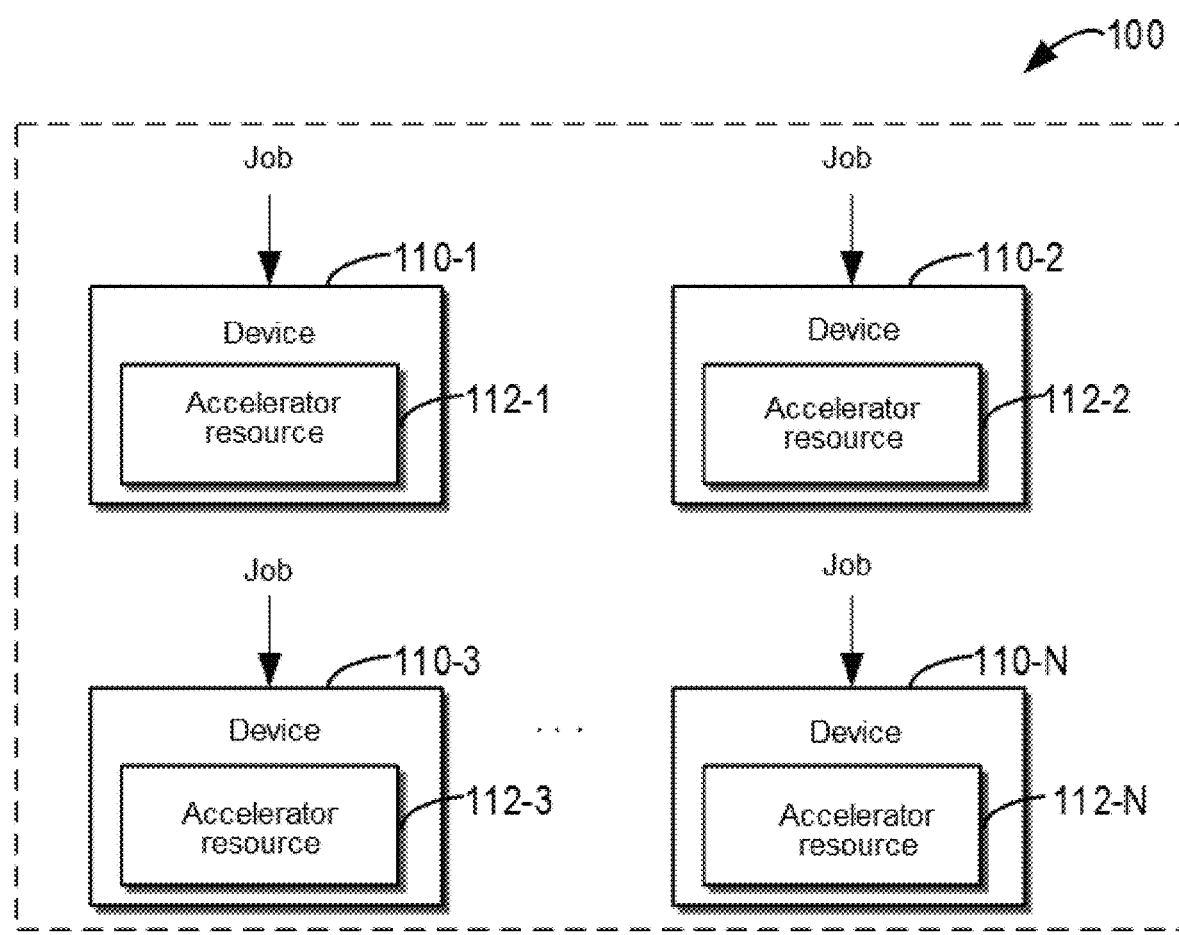
FIG. 1 illustrates a schematic diagram of an example system in which some embodiments of the present disclosure can be implemented.

Preferred embodiments of the present disclosure will be described in more detail below with reference to the accompanying drawings. While the preferred embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first," "second," and the like may refer to different or identical objects. Other explicit and implicit definitions may also be included below.

As described above, nodes in a storage system may be provided with accelerator resources, such as QAT cards, but there may be a phenomenon of uneven utilization of accelerator resources during job execution, which causes large processing latency for jobs.

Conventionally, when faced with the problem of insufficient accelerator resources, a simple solution is to upgrade the processing power of each device by deploying more accelerator resources. However, this will increase the overhead. In existing storage systems, there are some job scheduling schemes, but these schemes mainly schedule jobs by comparing the processing latency of various devices. Such schemes cannot adaptively schedule jobs among the devices to solve the problem of insufficient accelerator resources. In addition, such schemes need to acquire the processing latency of each device, which requires additional computational resources and processing time.

Embodiments of the present disclosure propose a solution for managing a storage system to solve one or more of the above problems and other potential problems. In this solution, a first device of the storage system sends, when it is determined that a local first accelerator resource is overloaded, a job processing request to a second device in a candidate device list to cause the second device to process a target job of the first device using a second accelerator resource of that second device. The solution further includes updating the candidate device list based on latency information received from the second device and related to the remote processing latency of processing the target job by the second accelerator resource.

In this manner, accelerator resource calling across nodes can be achieved by dynamically updating the candidate device list and selecting devices from the candidate device list. This not only improves the processing efficiency of jobs, but also improves the overall utilization of system resources.

The fundamental principles and several example embodiments of the present disclosure will be described in detail below with reference to the accompanying drawings.

FIG. 1 illustrates a schematic diagram of storage system 100 in which embodiments of the present disclosure can be implemented. Storage system 100 is used to provide tasks related to data storage, including such as storage, data access, and data protection (e.g., de-duplication, backup, encryption, decryption, etc.). It should be understood that the system illustrated in FIG. 1 is only an example. In practical applications, more other devices and/or components in devices may exist in the storage system, or the illustrated devices and/or components may be arranged in other manners.

As shown in FIG. 1, storage system 100 includes multiple (e.g., N) nodes. The nodes can be implemented by one or more computing devices, computing systems, servers, mainframes, edge devices, etc. The nodes are also referred to as devices herein. As shown, storage system 100 includes devices 110-1, 110-2, 110-3, . . . , and 110-N, where N is an integer greater than 1. Hereinafter, for ease of discussion, devices 110-1, 110-2, 110-3, . . . , and 110-N are sometimes referred to collectively or individually as device 110. Devices 110 are configured to execute various jobs of storage system 100.

In storage system 100, jobs to be executed at device 110 include various types of jobs related to data storage. As some examples, the jobs may include data backup jobs for performing a backup of user data, data recovery jobs for recovering damaged user data, and garbage collection jobs for collecting storage space in storage system 100 that is no longer occupied. Of course, these are just some specific examples. Other types of jobs may exist in storage system 100.

Each device 110 is deployed with corresponding resources, including processing resources, storage resources, network resources, etc., for executing corresponding jobs. Generally, in addition to general processing devices (not shown), each device 110 may further be deployed with accelerator resources. As shown in FIG. 1, device 110-1 includes accelerator resource 112-1, device 110-2 includes accelerator resource 112-2, device 110-3 includes accelerator resource 112-3, . . . , and device 110-N includes accelerator resource 112-N. Hereinafter, for ease of discussion, accelerator resources 112-1, 112-2, 112-3, . . . , and 112-N are sometimes referred to collectively or individually as accelerator resource 112.

The use of accelerator resources 112 can improve the processing performance of devices 110, so as to increase the overall throughput of storage system 100. In some embodiments, accelerator resource 112 may be one or more QAT cards. It should be understood that although in some embodiments of the present disclosure, QAT cards are used as an example of accelerator resources, accelerator resource 112 may also include other hardware processing devices with acceleration capabilities.

Depending on a storage system employed, in some embodiments, storage system 100 may include two devices (i.e., N=2) 110. In some embodiments, storage system 100 may include a scalable multi-node (multi-device) system that includes at least two (i.e., N≥2) devices 110. In such system, jobs may be scheduled to various devices 110 for execution. Each device 110 may be deployed with the same or different accelerator resources 112 for executing corresponding jobs.

It should be understood that storage system 100 shown in FIG. 1 is merely an example and not limiting. The storage system according to the present disclosure may also have other forms or structures.

Figure 2:
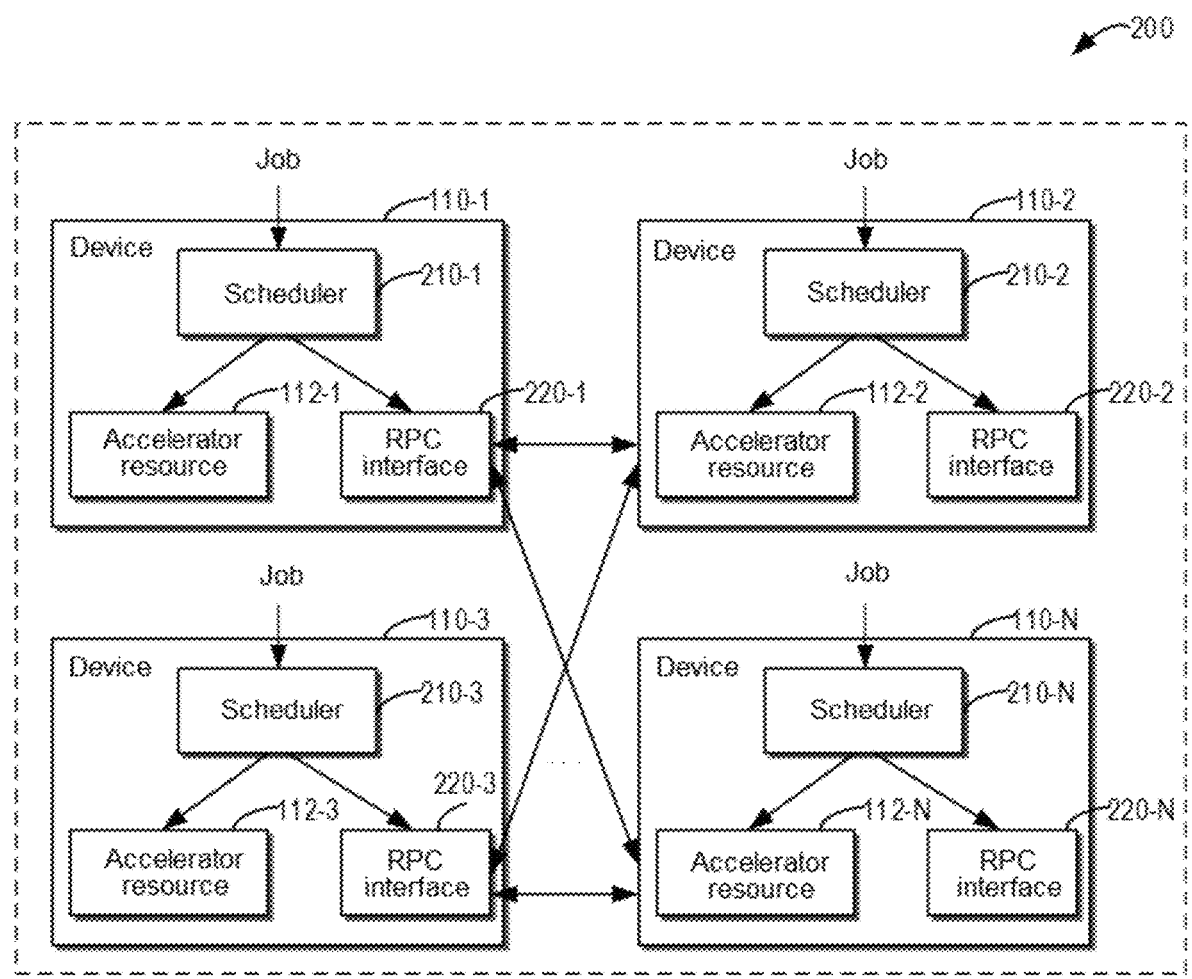
FIG. 2 illustrates a schematic block diagram of an example storage system according to some embodiments of the present disclosure.

FIG. 2 illustrates a schematic block diagram of example storage system 200 according to some embodiments of the present disclosure. For ease of discussion, on the basis of example storage system 200 in FIG. 2, the discussion continues on how to implement the usage of accelerator resources according to the embodiments of the present disclosure. As shown in FIG. 2, storage system 200 includes devices 110-1, 110-2, 110-3, . . . , and 110-N (which are referred to collectively or individually as device 110). Devices 110 are configured to execute various jobs of storage system 100. Device 110-1 includes accelerator resource 112-1, device 110-2 includes accelerator resource 112-2, device 110-3 includes accelerator resource 112-3, . . . , and device 110-N includes accelerator resource 112-N.

Compared with storage system 100 of FIG. 1, FIG. 2 illustrates a more detailed schematic block diagram of storage system 200. As shown in FIG. 2, various devices 110 of storage system 200 are also deployed with schedulers 210-1, 210-2, 210-3, . . . , and 210-N and remote procedure call (RPC) interfaces 220-1, 220-2, 220-3, . . . , and 220-N, respectively. Hereinafter, for ease of discussion, schedulers 210-1, 210-2, 210-3, . . . , and 210-N are sometimes referred to collectively or individually as scheduler 210, and RPC interfaces 220-1, 220-2, 220-3, . . . , and 220-N are sometimes referred to collectively or individually as RPC interface 220. Storage system 200 utilizes schedulers 210 and RPC interfaces 220 to implement accelerator resource calling across the devices.

Scheduler 210 in device 110 is configured to perform scheduling of jobs to be executed in device 110. When scheduling execution of a job, according to an embodiment of the present disclosure, scheduler 210 is configured to determine to schedule local accelerator resource 112 or remote accelerator resource 112 to execute the job. RPC interfaces 220 in devices 110 are configured to implement data access between devices 110 when it is determined to utilize remote accelerator resources. The function of RPC interfaces 220 will be discussed in detail hereinafter.

"Local accelerator resource" 112 herein refers to, with respect to current device 110, the accelerator resource deployed in device 110, and "remote accelerator resource" 112 refer to, with respect to current device 110, the accelerator resources deployed in other devices 110. For example, for device 110-1, accelerator resource 112-1 is a local accelerator resource, while accelerator resources 112-2, 112-3, . . . , 112-N, etc. are remote accelerator resources.

The inventor found through research that it is feasible to utilize remote accelerator resources to balance the local processing pressure, because the data transmission rate between devices may be realized to be fast, thereby reducing the network transmission latency between the devices. In common deployment of accelerator resources in some devices, if the system is busy, there are many jobs that need to be processed. For example, for a unit of data of 128 KB, the processing latency thereof may reach 1500 μs. However, between the devices connected based on a high-speed network interface such as a remote direct memory access (RDMA), the round-trip time for transmitting a unit of data may be between 355 μs and 135 μs. That is to say, compared with the higher processing latency of accelerator resources, the network transmission latency between devices may not have a great impact on the overall processing latency of jobs. Based on such research findings, the inventor proposes to increase the job processing rate in a local device by calling accelerator resources across devices, thereby improving the overall resource utilization.

In some embodiments, in storage system 200, devices 110 in which the accelerator resources can be scheduled across devices are connected through a high-speed network interface, e.g., a RDMA interface. In some examples, the RDMA interface may implement data transfer between devices 110 through various protocols, such as the protocol of RDMA over Converged Ethernet (RoCE). Other high-speed network interfaces are also feasible. In some embodiments, in order to improve processing performance in the case of cross-device scheduling, the round-trip time between devices 110 may be caused to be smaller than the local processing latency of single device 110, which may be achieved by selecting an appropriate network interface.

It should be understood that although FIG. 2 illustrates that scheduler 210 and RPC interface 220 are deployed in each device 110 of storage system 200, depending on actual needs, there may be only some devices 110 deployed with scheduler 210 and RPC interface 220 to realize the cross-device resource scheduling of the embodiments of the present disclosure. It should be noted that, for clarity, FIG. 2 does not show the coupling of RPC interfaces 220 to all other devices of storage system 100. For example, the coupling of RPC interface 220-1 of device 110-1 to device 110-3 is not shown. However, such coupling may exist according to actual needs.

Figure 3:
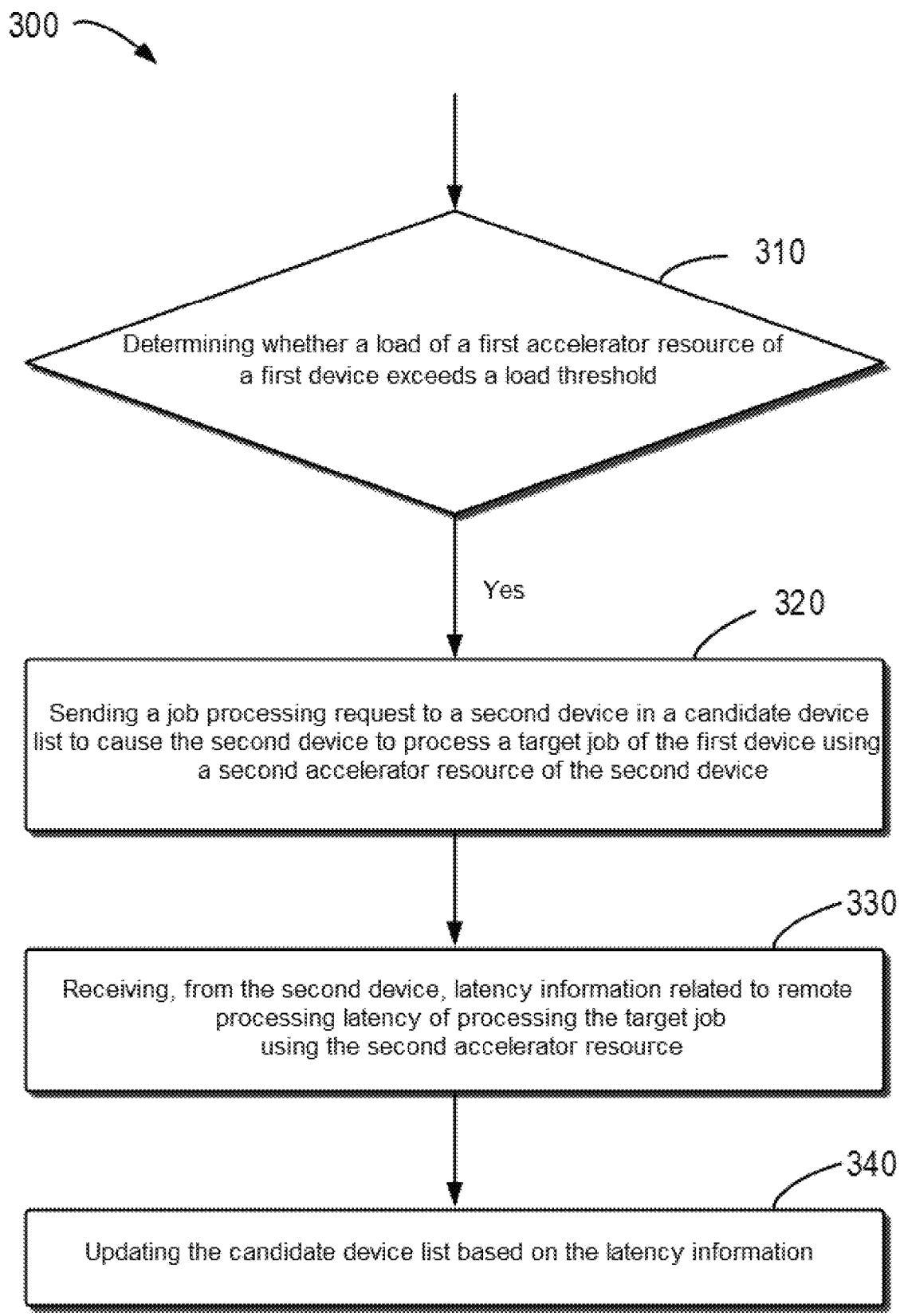
FIG. 3 illustrates a flow chart of an example method of resource usage according to some embodiments of the present disclosure.

The cross-device resource calling implemented at device 110 will be described below with reference to FIG. 3. FIG. 3 illustrates a flow chart of process 300 of resource usage according to some embodiments of the present disclosure. Process 300 may be implemented by device 110 of system 100. For example, it may be implemented by scheduler 210 of device 110. It should be understood that method 300 may also be executed by other appropriate devices or apparatuses. Method 300 may include additional actions not shown and/or may omit actions shown, and the scope of the present disclosure is not limited in this regard. For ease of description, process 300 will be described with reference to FIG. 2. Hereinafter, for ease of discussion, it is assumed that process 300 is implemented at device 110-1 in storage system 200 in FIG. 2. It should be understood that any device 110 in storage system 100 or storage system 200 may be configured to implement process 300 as needed.

Herein, device 110 (e.g., device 110-1) in which process 300 is implemented is sometimes referred to as "the first device," and accelerator resource 112 (e.g., accelerator resource 112-1) therein is sometimes referred to as "the first accelerator resource." Device 110 in other devices 110 (e.g., devices 110-2, 110-3, . . . , and 110-N) is sometimes referred to as "the second device," and accelerator resource 112 therein is sometimes referred to as "the second accelerator resource." The "first" and "second" used here are only for convenience of distinction.

As shown in FIG. 3, at 310, a first device determines whether a load of a first accelerator resource of the first device exceeds a load threshold. The load may refer to the amount of work to be processed by the first accelerator resource, or may refer to the amount of data to be processed by the first accelerator resource. The load threshold may be a predetermined or preset load threshold. For example, in some embodiments, the number of jobs of the first device that are to be processed by the first accelerator resource can be determined. If this number of jobs exceeds a predetermined number threshold, it is determined that the load of the first accelerator resource exceeds the load threshold.

In some embodiments, other methods may also be used to determine whether the load of the first accelerator resource exceeds the load threshold. For example, in some embodiments, the first device (e.g., device 110-1) determines whether a queue depth of requests to be processed by the first accelerator resource of the first device exceeds a queue depth threshold. This process will be described in more detail below in conjunction with FIG. 4.

Figure 4:
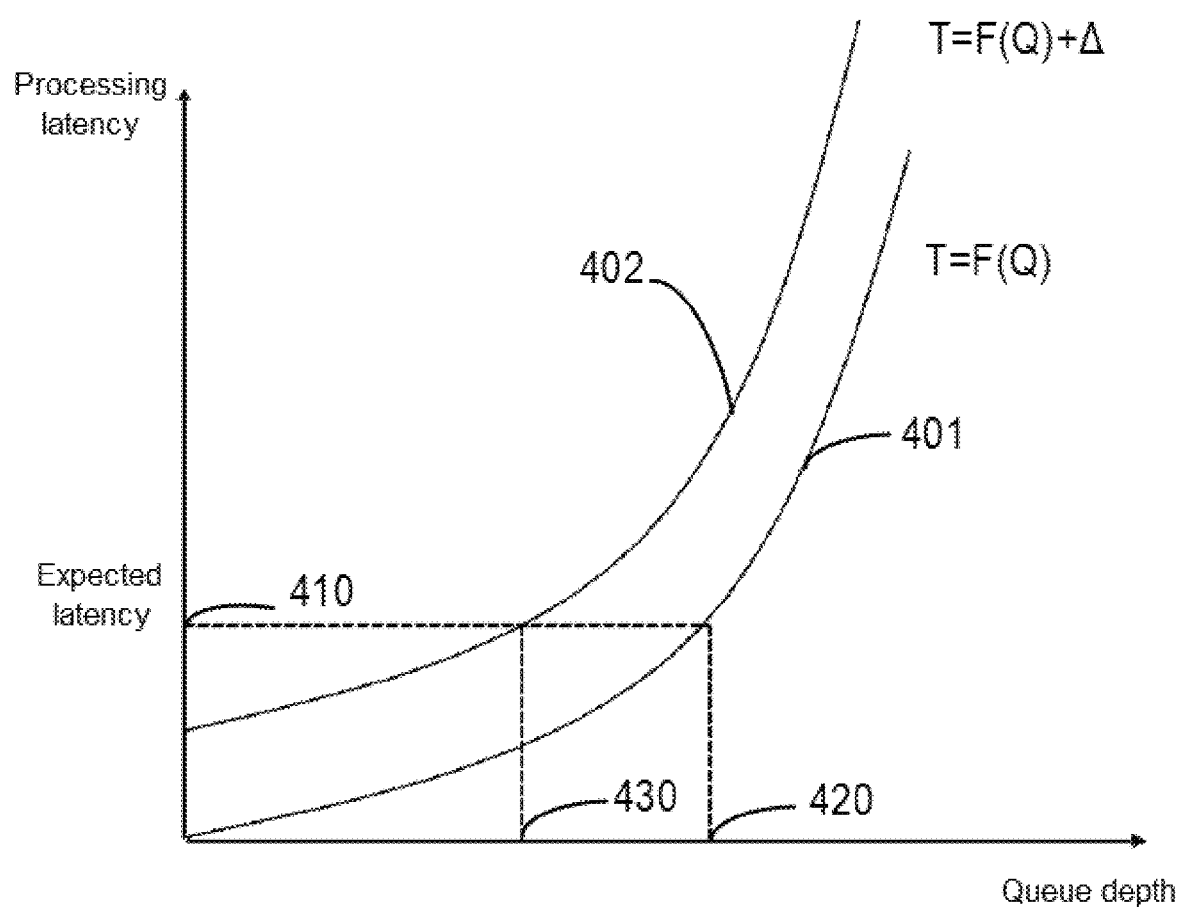
FIG. 4 illustrates a schematic diagram of curves for determining a load threshold according to some embodiments of the present disclosure.

FIG. 4 illustrates a diagram of curves for determining a predetermined queue depth threshold according to some embodiments. As shown in FIG. 4, curve 401 T=F(Q) may be a graph of the relationship between the queue depth and the local processing latency of the first accelerator resource drawn according to data in the user manual of the first accelerator resource. In some embodiments, the queue depth threshold can be determined according to curve 401 of FIG. 4 by expected latency 410 to be satisfied. In the example of FIG. 4, the queue depth threshold can be determined as queue depth 410. FIG. 4 additionally illustrates curve 402 $T=F(Q)+\Delta$ of the queue depth versus the remote processing latency of the second accelerator resource of another device 110. Curve 402 will be described in more detail hereinafter.

In some embodiments, the load threshold may also be determined based on experimental measurement data. For example, the load threshold that can meet the expected latency can be obtained by averaging the data measured through multiple experiments.

Returning to FIG. 3, if the first device determines at 310 that the load of the first accelerator resource exceeds the load threshold, method 300 proceeds to 320. At 320, the first device sends a job processing request to a second device in a candidate device list to cause the second device to process a target job of the first device using a second accelerator resource of the second device. This candidate device list indicates devices 110 in storage system 100 that can be used to assist the first device in job processing. For example, the candidate device list may indicate that devices 110 in storage system 100 other than the first device (e.g., device 110-1) can all be used to assist the first device in job processing. For another example, the candidate device list may indicate that one or more devices 110 (e.g., one or more of device 110-2, device 110-3, . . . , and device 110-N) in storage system 100 other than the first device (e.g., device 110-1) may be used to assist the first device in job processing.

In some embodiments, the second device may be any device selected from the candidate device list. Additionally or alternatively, a Round Robin algorithm may be used to select the second device from the candidate device list. For example, one device 110 can be selected as the second device from device 110-2, device 110-3, . . . , and device 110-N in sequence in a preset order.

Figure 5:
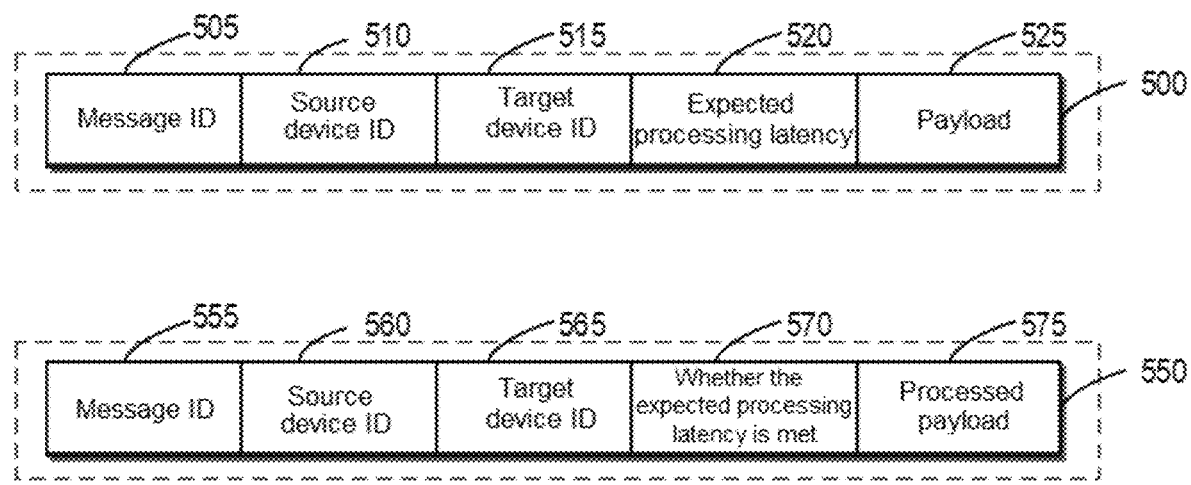
FIG. 5 illustrates a schematic diagram of an example job processing request sent by a first device to a second device and example latency information received by the first device from the second device according to some embodiments of the present disclosure.

Example job processing request 500 sent by the first device to the second device according to some embodiments is described with reference to FIG. 5. As shown in FIG. 5, job processing request 500 includes message identification (ID) 505, source device ID 510, target device ID 515, expected processing latency 520, and payload 525. For example, source device ID 510 may refer to the first device (e.g., device 110-1). Target device ID 515 may refer to the second device (e.g., device 110-2) selected by the first device. Expected processing latency 520 represents a processing latency threshold that is expected to be met, for example, 1500 μs. This is only illustrative and does not limit the present invention in any way, and the expected processing latency threshold may be any appropriate time length value. Payload 525 may include the target job of the first device that is to be processed by the second accelerator resource of the second device.

It should be understood that, in some embodiments, other forms of job processing requests may be used. For example, a job processing request including only the target job and the request sending time may be adopted. FIG. 5 also illustrates an example response result received by the first device from the second device, which will be described in more detail below.

Returning to FIG. 3, additionally or alternatively, if the first device determines at 310 that the load of the first accelerator resource does not have the load threshold, the first device continues to complete the target job. For example, device 110-1 continues to complete the target job.

At 330, the first device receives, from the second device, latency information related to remote processing latency of processing the target job using the second accelerator resource. For example, device 110-1 receives, from device 110-2, the latency information related to the remote processing latency spent in processing the target job (which may be included, e.g., in payload 525 of example job processing request 500) using accelerator resource 112-2 of device 110-2.

In some embodiments, the latency information may indicate a time period between a first moment when the first device sends the job processing request and a second moment when the first device receives the latency information. According to the length of the time period between the first moment and the second moment, the latency information can indicate whether the remote processing latency meets the needs.

In some embodiments, the latency information can use other information to indicate the remote processing latency. Returning to FIG. 4. FIG. 4 also illustrates curve 402 $T=F(Q)+\Delta$ of the queue depth versus the remote processing latency of the second accelerator resource of another device 110. A in FIG. 4 represents the latency difference A between the remote processing latency spent by the second accelerator resource in processing the target job and the local processing latency spent by the first accelerator resource in processing the target job. In some embodiments, each device 110 uses accelerator resource 112 of the same model, so the latency difference A may be a fixed value. For example, this latency difference A can be obtained through multiple offline experiment measurements, or obtained through the user manual of accelerator resource 112.

According to curves 401 and 402 shown in FIG. 4, it can be derived that the queue depth threshold of the first accelerator resource is queue depth 420 when the expected latency is expected latency 410. In contrast, when expected latency 410 is to be met, the queue depth threshold of the remote second accelerator resource is queue depth 430. Therefore, in some embodiments, the latency information received from the second device may be information about the queue depth of the second accelerator resource. With this queue depth information, it is possible to indicate whether the remote processing latency meets the expected latency. For example, if the queue depth indicated in the latency information exceeds queue depth 430, it is indicated that the remote processing latency does not meet expected latency 410. Conversely, if the queue depth indicated in the latency information does not exceed queue depth 430, it is indicated that the remote processing latency meets expected latency 410.

Example latency information 550 received by the first device from the second device according to some embodiments is described with reference to FIG. 5. As shown in FIG. 5, latency information 550 includes message identification (ID) 555, source device ID 560, target device ID 565, whether the expected processing latency is met 570, and processed payload 575. For example, source device ID 560 may refer to the first device (e.g., device 110-1). Target device ID 565 may refer to the second device (e.g., device 110-2) selected by the first device. Whether the expected processing latency is met 570 indicates whether the remote processing latency spent by the second accelerator resource in processing the target job meets the expected processing latency, for example, the expected processing latency indicated by expected processing latency 520 in FIG. 5. For example, whether the expected processing latency is met 570 being 1 can indicate that the expected processing latency is met, while being 0 can indicate that the expected processing latency is not met. Processed payload 575 may include the target job of the first device that has been processed by the second accelerator resource of the second device.

According to some embodiments, the latency information is information generated by the second device and sent to the first device. For example, device 110-2 receives a job processing request (such as job processing request 500 of FIG. 5) from device 110-1. In response to receiving the job processing request, device 110-2 processes the target job (e.g., payload 525 in FIG. 5) included in the job processing request. Device 110-2 further determines and creates latency information (e.g., latency information 550 of FIG. 5) according to the time spent in processing the target job, etc. In addition, device 110-2 also sends the latency information to the first device, for example, device 110-1.

Returning to FIG. 3, at 340, the first device updates the candidate device list based on the latency information. For example, device 110-1 updates the candidate device list based on the latency information received from device 110-2 that indicates a time period between a first moment when the first device sends the job processing request and a second moment when the first device receives the latency information. If the latency information indicates that the time period between the first moment and the second moment is longer than the expected processing latency threshold, device 110-2 is removed from the candidate device list. If the latency information indicates that the time period between the first moment and the second moment is shorter than the expected processing latency threshold, device 110-2 is maintained in the candidate device list.

Additionally or alternatively, in some embodiments, other approaches may also be used to update the candidate device list. In the following description with reference to FIG. 6, the process of updating the candidate device list will be described in more detail.

According to an embodiment of the present disclosure, when the load of the local first accelerator resource of the first device exceeds the load threshold, the second device can be selected from the candidate device list, and the target job of the first device can be processed by the second accelerator resource of the second device. In this way, the workload of the first accelerator resource of the first device can be reduced, and the overall performance of the storage system can be improved.

According to an embodiment of the present disclosure, the latency threshold is determined through the user manuals of the accelerator resources or experimental measurements of the storage system, and then the load threshold is determined. In addition, according to an embodiment of the present disclosure, it is determined whether the second device meets the remote processing latency requirement by receiving the latency information from the second device. In this way, the information of each remote device can be collected to dynamically update the candidate device list.

Further, the embodiments of the present disclosure can dynamically update the candidate device list. When a certain device in the candidate device list does not meet the latency requirement, it can be removed from the candidate device list. By dynamically updating the candidate device list, it is further ensured that the accelerator resources of devices in the candidate device list can assist the first accelerator resource of the first device to work. Furthermore, the devices in the storage system can be better coordinated and it is ensured that the execution of jobs of the devices is aligned with the service level agreement (SLA) requirements of the jobs. Furthermore, the overall performance of the storage system can be improved.

In some embodiments, when the first device sends a job processing request to the second device, scheduler 210 of the first device can call RPC interface 220 to implement data transmission between the two devices, so as to execute the job using the selected remote second accelerator resource. RPC interface 220 is used to assign data accesses (e.g., input/output (I/O) accesses) for the job to be executed to remote accelerator resource 112.

For local device 110, during the execution of a job, transactions to be executed include sending data to be processed of this job to a remote device, and acquiring processed data from the remote device asynchronously through a callback function and the like. For remote device 110, during the execution of a job, transactions to be executed include receiving from another device 110 data to be processed, processing the received data using accelerator resource 112, and returning the processed data to another device 110. It should be understood that such cross-device data transmission and receiving can be implemented in various ways, and there is no specific limitation here.

Connecting devices 110 via a high-speed network interface (e.g., RDMA, etc.) causes cross-device data transmission and receiving to be completed very quickly. Therefore, it will not cause large latency due to the transmission of data between various devices. In this way, other devices 110 in storage system 100 can be used to assist local device 110 to complete jobs, thus avoiding excessive latency caused by too many jobs.

Figure 6:
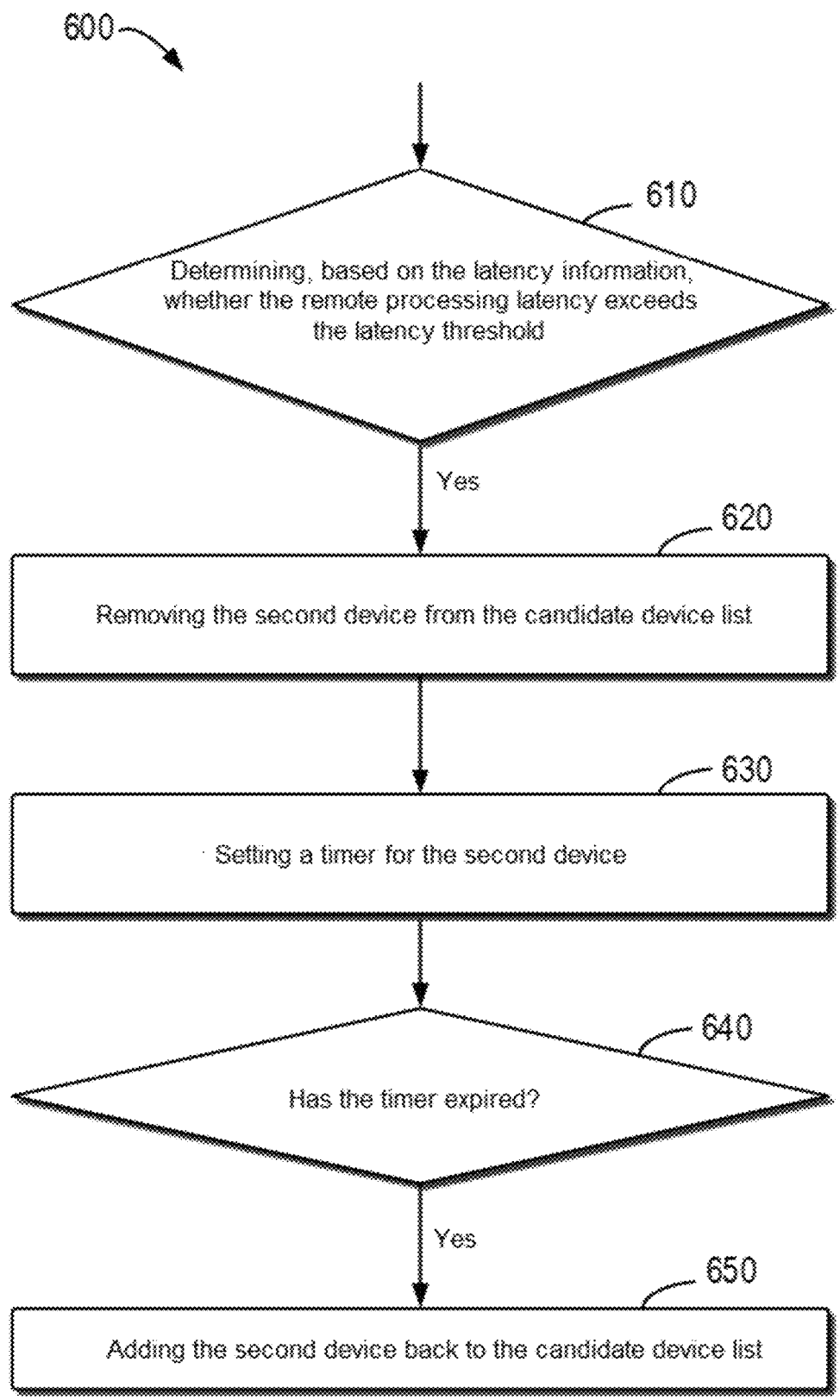
FIG. 6 illustrates a flow chart of an example method for updating a candidate device list according to some embodiments of the present disclosure.

In some embodiments, method 600 shown in FIG. 6 can be used to update the candidate device list. Several embodiments for updating the candidate device list will be described in more detail below in conjunction with FIG. 6.

FIG. 6 illustrates a schematic diagram of example method 600 for updating a candidate device list according to some embodiments of the present disclosure. Method 600 may be regarded as an example implementation of block 340 in method 300. Method 600 may be, for example, executed by device 110 of storage system 100 as shown in FIG. 1. For example, it can be implemented by scheduler 210 of device 110. It should be understood that method 600 may also be executed by other appropriate devices or apparatuses. Method 600 may include additional actions not shown and/or may omit actions shown, and the scope of the present disclosure is not limited in this regard. For ease of description, process 600 will be described with reference to FIGS. 2 and 5. Hereinafter, for ease of discussion, it is assumed that process 600 is implemented at device 110-1 in storage system 200 in FIG. 2. It should be understood that any device 110 in storage system 100 or storage system 200 may be configured to implement process 600 as needed.

As shown in FIG. 6, at 610, the first device determines, based on the latency information, whether the remote processing latency exceeds the latency threshold. In some embodiments, device 110 can determine, based on latency information 550 as shown in FIG. 5, whether the remote processing latency exceeds the latency threshold. If whether the expected processing latency is met 570 in latency information 550 indicates that the expected processing latency is not met, it is determined that the remote processing latency exceeds the latency threshold. It should be understood that other types of latency information can be used to determine whether the remote processing latency exceeds the latency threshold.

If it is determined at 610 that the remote processing latency exceeds the latency threshold, method 600 proceeds to 620. At 620, the first device removes the second device from the candidate device list. For example, device 110-2 used to generate the latency information is removed from the candidate device list.

Additionally or alternatively, if the first device determines at 610 that the remote processing latency does not exceed the latency threshold, the second device will be maintained in the candidate device list. For example, device 110-2 will be maintained in the candidate device list.

At 630, the first device sets a timer for the second device. For example, device 110-1 sets a timer (e.g., 2000 μs) for device 110-2. It should be understood that the timer length of 2000 μs described above is merely schematic and not limiting. In some embodiments, other timer lengths may be selected.

At 640, it is determined whether the timer has expired. For example, device 110-1 determines whether the timer for device 110-2 has expired. If it is determined at 640 that the timer has expired, method 600 proceeds to 650. At 650, the first device adds the second device back to the candidate device list. For example, device 110-1 adds device 110-2 back to the candidate device list.

In this way, the candidate device list can be updated dynamically. When the remote processing latency of a certain device in the candidate device list does not meet the expected latency, it can be removed from the candidate device list, thus avoiding long unsatisfactory latency that is caused by processing the target task using this device.

Further, by simply judging the latency information, it is possible to determine the status of the remote device without collecting the remote processing latency of each remote device. Therefore, the embodiments of the present disclosure can avoid unnecessary processing work and can more simply and conveniently select the second device from the candidate device list to assist the first device in task processing.

In addition, by setting a timer for it, it is possible to add this device back to the candidate device list after the timer expires. In this way, the device can be added back to the candidate device list when it is no longer busy after a certain period of time. Thus, it is possible to make the candidate device list always have enough candidate devices to coordinate tasks with the first device. In this way, it is possible to coordinate tasks between devices in a more flexible manner and to better improve the overall performance of the storage system.

Figure 7:
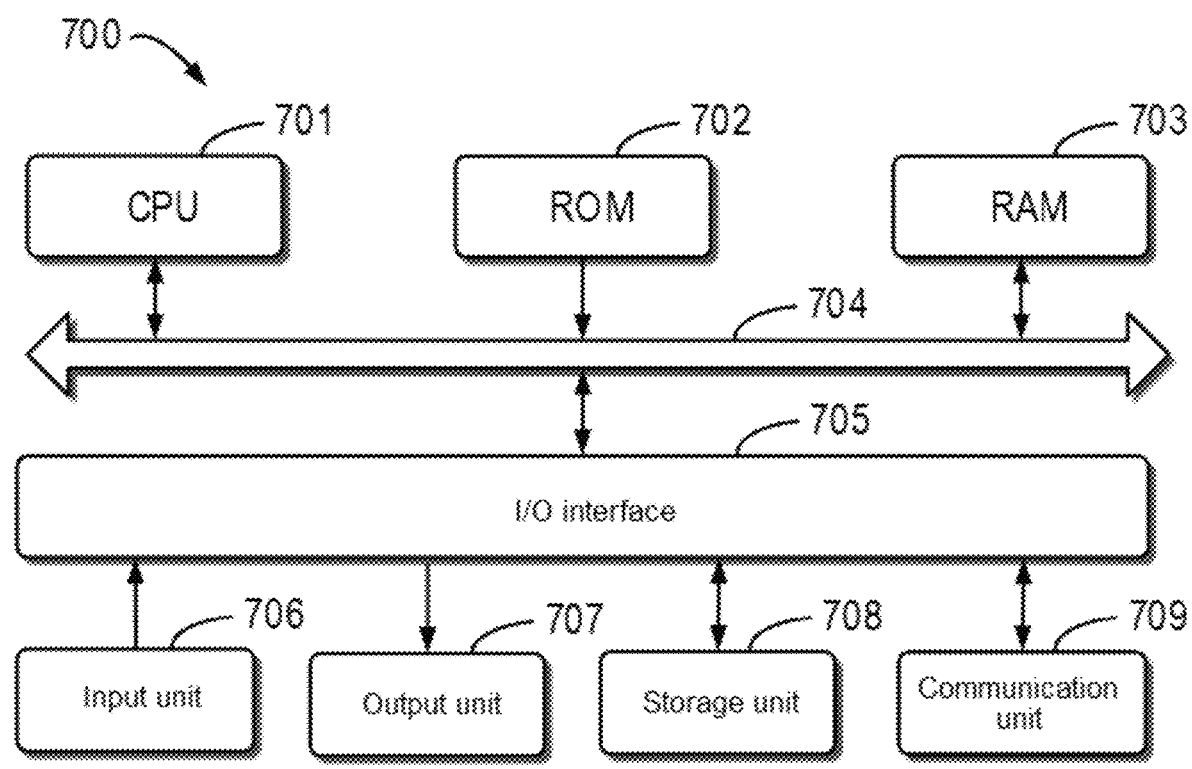
FIG. 7 illustrates a schematic block diagram of an example device that can be used to implement embodiments of the present disclosure.

FIG. 7 illustrates a schematic block diagram of example device 700 that can be configured to implement embodiments of the present disclosure. For example, storage system 100 as shown in FIG. 1 may be implemented by device 700. As shown in FIG. 7, device 700 includes central processing unit (CPU) 701 that may perform various appropriate actions and processing according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The various processes and processing described above, such as method 300 and/or 600, may be performed by processing unit 701. For example, in some embodiments, methods 300 and/or 600 may be embodied as a computer software program that is tangibly included in a machine-readable medium, such as storage unit 708. In some embodiments, part or all of the computer program may be loaded and/or installed to device 700 via ROM 702 and/or communication unit 709. When the computer program is loaded into RAM 703 and executed by CPU 701, one or more actions of methods 300 and/or 600 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object-oriented programming languages such as Smalltalk, C++, and the like, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, including:
   determining, at a first device of the storage system, whether a load of a first accelerator resource of the first device exceeds a load threshold;
   in response to determining that the load exceeds the load threshold, sending a job processing request to a second device in a candidate device list to cause the second device to process a target job of the first device using a second accelerator resource of the second device, the candidate device list indicating devices in the storage system that can be used to assist the first device in job processing;
   receiving, from the second device, latency information related to remote processing latency of processing the target job using the second accelerator resource; and
   updating the candidate device list based on the latency information.

2. The method according to claim 1, wherein updating the candidate device list includes:
   determining, based on the latency information, whether the remote processing latency exceeds a latency threshold; and
   removing the second device from the candidate device list if it is determined that the remote processing latency exceeds the latency threshold.

3. The method according to claim 2, further including:
   setting a timer for the second device in response to the second device being removed from the candidate device list; and
   adding the second device back to the candidate device list in response to an expiration of the timer.

4. The method according to claim 2, wherein the load threshold is determined based on the latency threshold.

5. The method according to claim 1, wherein the remote processing latency includes a time period between a first moment when the first device sends the request and a second moment when the latency information is received.

6. The method according to claim 1, wherein determining whether the load of the first accelerator resource exceeds the load threshold includes:

determining a number of jobs of the first device that are to be processed by the first accelerator resource; and determining that the load of the first accelerator resource exceeds the load threshold if the number exceeds a number threshold.

7. The method according to claim 1, wherein the first device is connected to devices in a candidate node list via a high-speed network interface.

8. The method according to claim 1, wherein the first accelerator resource and the second accelerator resource each include a Quick Assist Technology (QAT) card.

9. A non-transitory machine readable medium having instructions stored therein, which when executed by a processor, cause the processor to perform actions, the actions including:

determining, at a first device of a storage system, whether a load of a first accelerator resource of the first device exceeds a load threshold;

in response to determining that the load exceeds the load threshold, sending a job processing request to a second device in a candidate device list to cause the second device to process a target job of the first device using a second accelerator resource of the second device, the candidate device list indicating devices in the storage system that can be used to assist the first device in job processing;

receiving, from the second device, latency information related to remote processing latency of processing the target job using the second accelerator resource; and updating the candidate device list based on the latency information.

10. The machine readable medium according to claim 9, wherein updating the candidate device list includes:

determining, based on the latency information, whether the remote processing latency exceeds a latency threshold; and removing the second device from the candidate device list if it is determined that the remote processing latency exceeds the latency threshold.

11. The machine readable medium according to claim 10, wherein the actions further include:

setting a timer for the second device in response to the second device being removed from the candidate device list; and adding the second device back to the candidate device list in response to an expiration of the timer.

12. The machine readable medium according to claim 10, wherein the load threshold is determined based on the latency threshold.

13. The machine readable medium according to claim 9, wherein the remote processing latency includes a time period between a first moment when the first device sends the request and a second moment when the latency information is received.

14. The machine readable medium according to claim 9, wherein determining whether the load of the first accelerator resource exceeds the load threshold includes:

determining a number of jobs of the first device that are to be processed by the first accelerator resource; and determining that the load of the first accelerator resource exceeds the load threshold if the number exceeds a number threshold.

15. The machine readable medium according to claim 9, wherein the first device is connected to devices in a candidate node list via a high-speed network interface.

16. The machine readable medium according to claim 9, wherein the first accelerator resource and the second accelerator resource each include a Quick Assist Technology (QAT) card.

17. An electronic device operating as a first device of a storage system, the electronic device comprising:

a processor; and a memory coupled to processor storing instructions, which when executed by the processor, cause the processor to perform actions, the actions including:

determining whether a load of a first accelerator resource of the first device exceeds a load threshold;

in response to determining that the load exceeds the load threshold, sending a job processing request to a second device in a candidate device list to cause the second device to process a target job of the first device using a second accelerator resource of the second device, the candidate device list indicating devices in the storage system that can be used to assist the first device in job processing;

receiving, from the second device, latency information related to remote processing latency of processing the target job using the second accelerator resource; and updating the candidate device list based on the latency information.

18. The electronic device according to claim 17, wherein updating the candidate device list includes:

determining, based on the latency information, whether the remote processing latency exceeds a latency threshold; and removing the second device from the candidate device list if it is determined that the remote processing latency exceeds the latency threshold.

19. The electronic device according to claim 18, wherein the actions further include:

setting a timer for the second device in response to the second device being removed from the candidate device list; and adding the second device back to the candidate device list in response to an expiration of the timer.

20. The electronic device according to claim 18, wherein the load threshold is determined based on the latency threshold.

* * * * *